Figure 1:
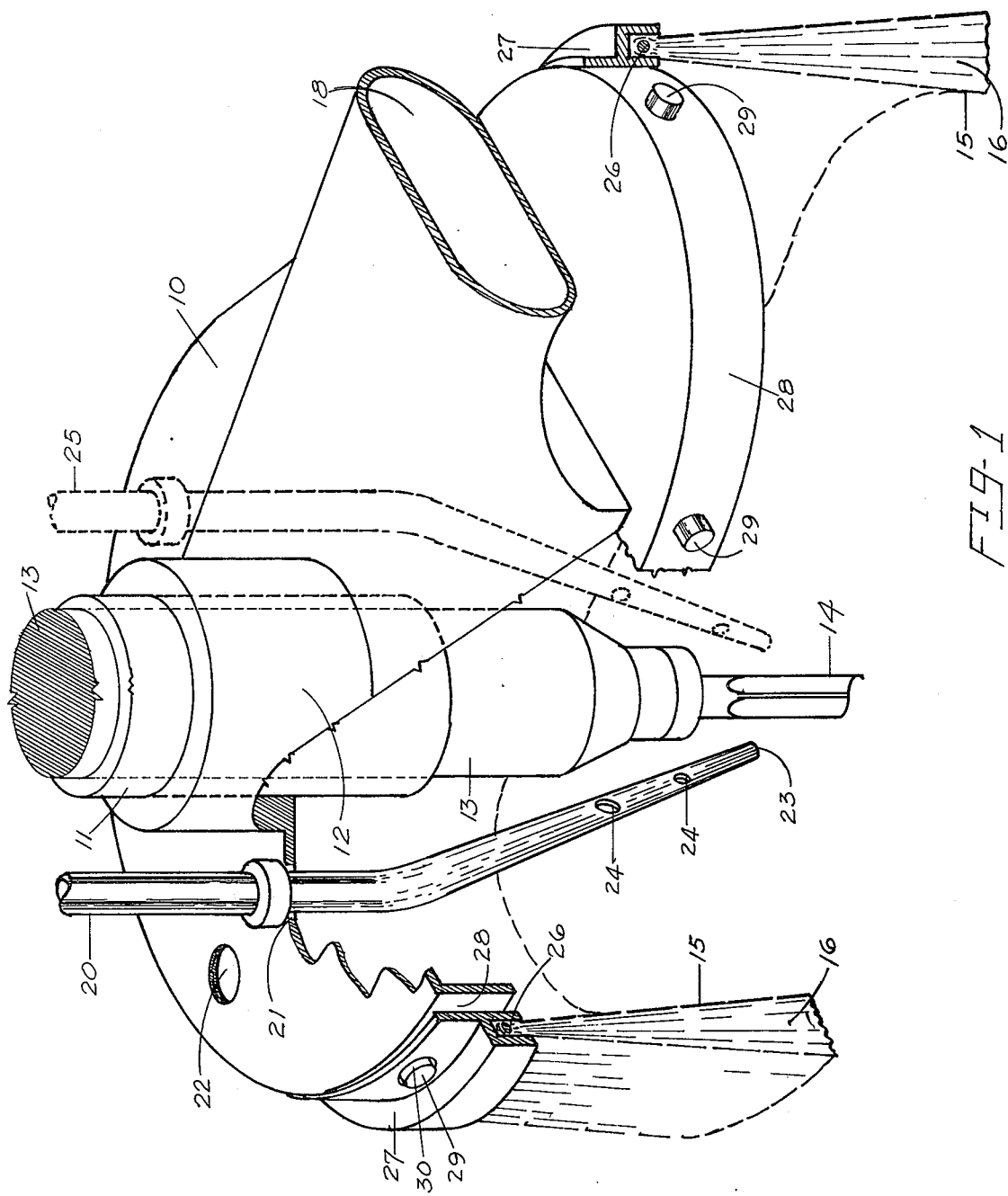

United States Patent [19]

Davis

[11] 4,011,792
[45] Mar. 15, 1977

[54] ROTARY TOOL EXHAUST HOOD

[76] Inventor: Wallace J. Davis, Route 11, Box 290, Lenoir, N.C. 28645

[22] Filed: Nov. 7, 1975

[21] Appl. No.: 629,868

[52] U.S. Cl. .................................. 90/11 R; 408/61; 408/241 R
[51] Int. Cl.² ............... B23C 1/00; B23B 51/06; B23B 39/00
[58] Field of Search ............... 90/11 R, DIG. 13; 408/56, 61, 241; 51/177, 273; 15/345, 346; 83/100, 169; 144/252 R

[56] References Cited

UNITED STATES PATENTS

| 2,723,405 | 11/1955 | Woodward | 408/61 |
| 3,161,900 | 12/1964 | Hornschuch et al. | 15/345 |
| 3,694,848 | 10/1972 | Alcala | 15/346 |
| 3,826,045 | 7/1974 | Champagne | 51/273 X |
| 3,880,047 | 4/1975 | Dosier | 51/273 X |
| 3,882,644 | 5/1975 | Cusumano | 51/273 X |

Primary Examiner—Harrison L. Hinson
Attorney, Agent, or Firm—James E. Britt

[57] ABSTRACT

Rotary cutting tools normally throw out chips and other particles from the surface or edge being cut. According to this invention, an exhaust hood, arranged to be connected to an exhaust system, having a bristle skirt is mounted to enclose an area about the tool, a strong jet of air from a jet nozzle put through the hood is directed toward the cutting portion of the tool and at the stream of chips being thrown off to disburse all of the chips and particles up into the air stream being exhausted from the hood causing them to become airborne. The air stream entering the hood through the interstices in the skirt and rushing across the hood and out through the exhaust port will so completely capture the airborne chips and particles that none will escape into the general atmosphere of the machine room.

3 Claims, 1 Drawing Figure

U.S. Patent

Mar. 15, 1977

4,011,792

ROTARY TOOL EXHAUST HOOD

This invention relates to router type tools mounted on a motor driven spindle. It relates more particularly to combination exhaust heads or hoods and guard bonnets by means of which chips removed by the router are confined or captured and removed and disposed of without cluttering and contaminating the surrounding area.

Routers within the scope of this invention may include a rotary cutting knife, router bit, drill bit, saw, shaping cutter, grinding wheel or other rotary tool which will throw out relatively heavy chips, and other particles as the tool engages a work piece.

The invention may be applied to machines which utilize a mobile or stationary table to which a work piece may be secured. Or it may be used on automatic machines with a fixed or floating head. It is also adapted to be used on manually fed machines.

It is an object of this invention to provide a simple head or bonnet easily mounted which will completely capture and exhaust the particles thrown off by a router or other tool as it engages a work piece.

It is another object to provide a device to be used with machines employing router tools which will go well toward meeting all environmental reqirements as to chip or particle disposal.

It is a further object to provide means to inflict changes in direction of chips or other particles thrown off by as they leave a rotary tool and cause them to become more readily airborne in an exhaust stream passing through the hood by means of which said chips may be completely drawn away and disposed of.

It is still another object to employ under the hood a combination of two air streams, one an exhaust stream to pull the air entrained the chips or particles out and another a jet stream inserted under the hood and directed against the flood of particles chips or other as they leave the tool and cause them to be disbursed upward and become airborne in the exhaust stream. The particles are then captured and completely removed with the exhaust stream thereby avoiding contamination of the surrounding area.

The principles of this invention can be adapted to any position other than vertical in which the tool may be disposed.

The accomplishment of these and other objects and advantages will become apparent by reference to the detailed description and the accompanying drawings in which:

FIG. 1 is a pictorial view showing details of the invention.

It is to be understood that the form of the invention described is an adaptation for a typical machine, the shape or size of the structure may be modified to adapt to fit other machines without departing from the spirit of the invention.

Referring now to the drawings, the machine on which the hood or bonnet 10 is to be used would be provided with some detail for attachment such as a sleeve 11 over or onto which an adaptor or collar 12 of the hood would be fitted and adjustably secured by any suitable means. A motor driven chuck or head 13 carries a working router or tool 14.

The body of the bonnet 10 is shaped so that, when a skirt 15 is fitted around it, it provides a shroud that encloses the tool and a volume of the air space surrounding it. The skirt 15 will embody bristles 16 dropping down a suitable distance toward a work piece supporting table, not shown. The interstices in the bristles of the skirt and a suitable space left below it provide for air to be drawn in from all sides to form a stream which gathers and is sucked through the bristles and the space under the hood and out through an exhaust connection 18 into a general exhaust conduit, not shown.

A large portion of the chips, dust and other particles may be taken away by the general arrangement of parts thus far described. However, there is a tendency in the prior art arrangements for the particles thrown off to leave in a well defined stream and congregate in a small area of the space under the hood and lodge and accumulate and in some cases escape or be dragged out when a work piece passes in or out of the space under the hood.

The problem is solved by inserting a jet of air under the hood directed at the stream of chips to flush the same up into the air. This is provided by a tube 20 inserted through a suitable positioned opening 21 or 22 in the hood 10 reaching in and terminating in a jet nozzle 23 which is set to bring the jet stream against the stream of particles leaving the rotating tool 14. The nozzle will be so located that upon contact of the jet stream of air, usually under very high pressure, with the particles they will be redirected and flushed up into the suction stream and become completely airborne enabling them to be readily captured and drawn out with the suction stream of air and away into an exhaust system.

In certain situations it will be desirable to have more than one opening or point of insertion and mounting for the jet tube 20, such as the alternate opening 22. The tube may be provided with orifices 24 along its length to add to the flushing action of the jet. If desired, one or more, jet tubes 25 shown in phantom may be inserted in addition to the main tube 20 to assure positive disbursing of heavy chips that are thrown off.

The bristle skirt 15 is of a suitable length to extend down toward a table or work carrying surface, not shown, to enclose the space about the tool 14. The skirt is comprised of bristles 16 looped at their head about a core member 26 and gripped by the opposed sides of an h shaped channel 27. This channel is formed to fit closely around the flanged edge 28. It is held in place by studs 29 extending through suitable holes 30 in the upstanding leg of the h channel. The ends of the channel extend around until they meet and may be joined by a suitable buckle, not shown. The channel 27 is made flexible so that when the joining buckle is released the channel may open up enough to slide it over the studs 29 and be removed. It may be replaced with a new skirt or one of different detail.

It should be pointed out that a primary accomplishment of this invention is the flushing or disbursing up of the chips into the air as fast as they leave the cutting tool and never letting them come to rest under the hood. Lifting chips up from the floor where they have settled is one kind of operation. Keeping them airborne or suspended is another. This latter operation the present invention does.

In operation, a bristle skirt 15 of suitable length and density is mounted on the hood 10. The length of the bristles 16 should be such that they will easily flex to allow the type of work piece being processed to pass under the hood and come into engagement with the tool. If hold down clamps are used, the length of the bristles chosen should be such that the clamps will easily pass through the skirt. The interstices of the skirt and the clearance between the skirt and work table should provide density such as to allow the exhaust stream to sweep through the hooded air space. The length and clearance of the skirt determines the axial position of the hood.

As preparation for the operation takes place, a suitable jet tube 20 is inserted through opening 21 or 22 and positioned so that a jet of air under high pressure is directed at the stream of chips or particles leaving the tool so as to deflect and disburse even the heaviest chips up into the air stream being sucked through the hooded space. Once airborne, all the particles will be readily captured, entrained in the air stream and completely exhausted from the hood 10 through the exhaust outlet 18.

The prior art, in general, shows hoods about motor driven tools with different arrangements for exhausting the air from the hoods. However, the present invention is directed toward the improvement accomplished by introducing an intense jet stream pointed directly at the stream of chips and other particles, leaving a router or cutting tool, disbursing them up into the air stream causing them to become airborne and swept away in the exhaust stream before they could settle down and accumulate in remote areas of the hood.

The novelty to this invention is fully set forth therein and it is desired that the scope thereof be limited by only such limitations as are imposed by the prior art or as set forth in the appended claims as follows:

I claim:

1. A machine tool having in combination a motor driven chuck carrying a rotary cutting tool which, in operation, throws off a stream of relatively heavy chips and other particles, a hood or bonnet mounted on the machine having means providing for axial adjustment of the same, said hood having a body extending over an area surrounding the tool, a skirt attached to the hood and arranged to drop down around and enclose the tool, said skirt embodying bristles incorporating appropriate interstices for admitting ambient air, said hood having an exhaust opening for connecting the same with an exhaust system, the suction from which draws a suction air stream through and out of the hooded space, and means for introducing under the hood a jet of air under pressure directed at said stream of chips, disbursing the same into the suction air stream for effective capture and withdrawal of the chips with the air stream.

2. A machine according to claim 1 in which the means for introducing an air jet under the hood comprises a nozzle set to project the jet of air directly at the stream of chips leaving the operating tool, to cause the stream of chips to be deflected and the stream disbursed into the suction air stream and become completely airborne before they chance to drift into non-turbulent areas under the hood, thereby rendering immediate and complete withdrawal of chips with the air stream as they are thrown off by the tool.

3. A machine according to claim 1, in which the hood is provided with means to effect interchange of skirts having bristles of different characteristics as to flexibility, length and interstices in the bristles and means to secure the axial position of the hood to accommodate a skirt according to its bristle length.

* * * * *